(No Model.)
J. HEIDORF.
SLED PROPELLER.
No. 342,257. Patented May 18, 1886.
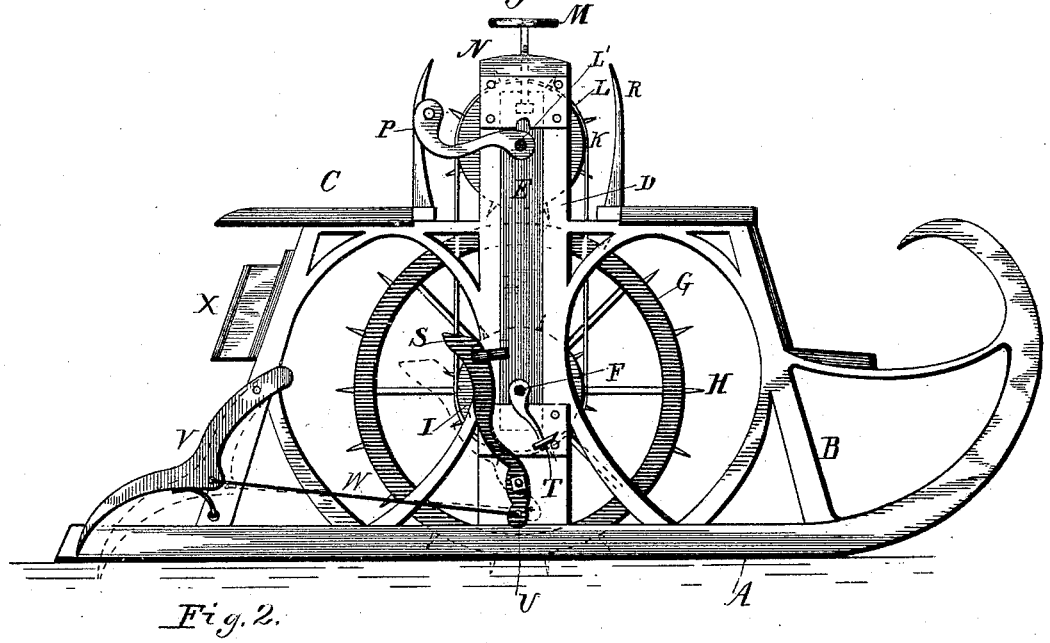
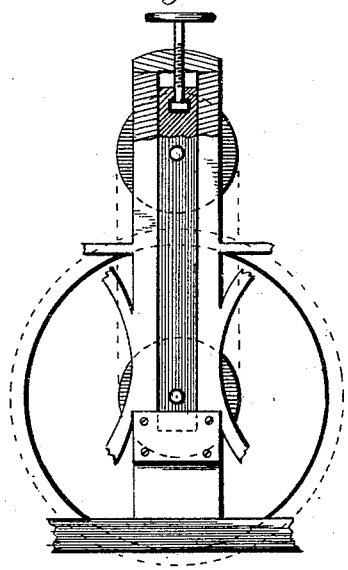
Witnesses:
B. C. Finwick
D. J. Gibbon
Inventor:
Joseph Heidorf
By H. J. Ennis
Atty

United States Patent Office.

JOSEPH HEIDORF, OF SARATOGA SPRINGS, NEW YORK.

SLED-PROPELLER.

SPECIFICATION forming part of Letters Patent No. 342,257, dated May 18, 1886.

Application filed February 23, 1886. Serial No. 192,911. (No model.)

*To all whom it may concern:*

Be it known that I, JOSEPH HEIDORF, a citizen of the United States, residing at Saratoga Springs, in the county of Saratoga and State of New York, have invented certain new and useful Improvements in Sled Propellers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in sled-propellers, and it has for its objects to provide means whereby the sled may be propelled either by hand or foot power at will, by means of which the sled-frame may be elevated on the journal-bearings of the driving-wheel, so as to permit the sprocket points of the wheel to work to different extents into the snow or ice, or clear the surface of the same entirely, and also to provide an improved brake, which may be applied by the feet of the rider, as more fully hereinafter specified. These objects I attain by the means illustrated in the accompanying drawings, in which—

Figure 1 represents a side elevation of my invention complete; Fig. 2, a detached view showing the elevating devices partly in section, and Fig. 3 a sectional view of the sled-runner.

The letter A indicates the sled-runners, which support the frames B at each side of the sled, on the top of which at the rear is a seat, C, for the rider. The frame on each side is provided with vertical guides D, in which are located the movable slides E, in which the journals of the driving mechanism have their bearings.

To the lower shaft, F, is secured a driving-wheel, G, which has sprockets H on its periphery, which take into the ice or snow when the wheel is rotated, and thus propel the sled. At each side of said wheel, and mounted on the same shaft, are smaller sprocket-wheels I, which connect, by means of perforated belts K, with similar sprocket-wheels, L, mounted on a shaft, L', which is journaled in bearings in the vertical slide before mentioned.

M indicates two set-screws passing through the cross-heads N, by means of which the slides may be elevated or depressed, so as to raise or lower the frame and permit the sprockets on the sprocket-wheel to take to a greater or less extent in the snow or ice, or let the sled run free in descending a grade. The upper shaft on each end is provided with a hand-crank shaft, P, by means of which the wheels may be put into operation to propel the sled. The upper wheels have secured in the front and rear of them shields R, the said shields being attached to the top of the frame, so as to protect both the wheels and the person of the rider. To the sides of the frame, at convenient points, are secured temporarily the foot rests S, which may be removed when the arms of the rider are tired, so as to permit the foot-crank arms T to be attached to the lower shaft, and operate the mechanism by foot-power. To the lower part of the frame, on opposite sides, are pivoted foot-levers U, which connect with the brake-levers V by means of chains W, which are also pivoted to the sides of the frame in such position as to be forced into the snow or ice when the foot-levers are depressed. These levers also serve as guides for turning the sled to the right or left by operating the levers singly. To the rear of the frame, under the seat, is secured a box, X, having a suitable cover for holding the removable parts of the sled and necessary tools.

Having thus described my invention, what I claim, and desire to secure by Letters Patent, is—

1. The combination, with the main frame, of the vertical brackets, the sprocket wheels, and operating mechanism, and the shields arranged at the front and rear of the sled, substantially as specified.

2. The combination, with the frame, of the detachable foot-rests, as and for the purposes specified.

3. The combination, with the main frame, of the foot-levers, with the brake-levers and connecting-chains, whereby the brake-levers are operated to arrest the speed or guide the sled, substantially as specified.

In testimony whereof I affix my signature in presence of two witnesses.

JOSEPH HEIDORF.

Witnesses.
H. J. ENNIS,
E. H. BRADFORD.